United States Patent
Filsfils et al.

(10) Patent No.: US 9,014,049 B2
(45) Date of Patent: Apr. 21, 2015

(54) SELECTIVELY POPULATING FORWARDING INFORMATION BASES IN A PACKET SWITCH

(75) Inventors: Clarence Filsfils, Brussels (BE); John H. W. Bettink, San Jose, CA (US); George Leonard Swallow, Boston, MA (US)

(73) Assignee: Cisco Technology, Inc., San Jose, CA (US)

( * ) Notice: Subject to any disclaimer, the term of this patent is extended or adjusted under 35 U.S.C. 154(b) by 682 days.

(21) Appl. No.: 13/095,846

(22) Filed: Apr. 27, 2011

(65) Prior Publication Data

US 2012/0275338 A1 Nov. 1, 2012

(51) Int. Cl.
*H04L 12/28* (2006.01)
*H04L 12/46* (2006.01)
*H04L 12/947* (2013.01)
*H04L 12/935* (2013.01)
*H04L 12/939* (2013.01)

(52) U.S. Cl.
CPC .......... *H04L 12/4625* (2013.01); *H04L 49/252* (2013.01); *H04L 49/3009* (2013.01); *H04L 49/552* (2013.01)

(58) Field of Classification Search
None
See application file for complete search history.

(56) References Cited

U.S. PATENT DOCUMENTS

| | | | |
|---|---|---|---|
| 6,751,190 B1 | 6/2004 | Swallow | |
| 7,212,526 B2 * | 5/2007 | Kanetake | 370/386 |
| 7,233,569 B1 | 6/2007 | Swallow | |
| 7,342,874 B2 * | 3/2008 | Pegrum et al. | 370/218 |
| 7,406,031 B1 | 7/2008 | Swallow | |
| 7,990,993 B1 * | 8/2011 | Ghosh et al. | 370/428 |
| 8,077,726 B1 * | 12/2011 | Kumar et al. | 370/395.31 |
| 2003/0063613 A1 * | 4/2003 | Carpini et al. | 370/401 |
| 2005/0220072 A1 * | 10/2005 | Boustead et al. | 370/351 |
| 2009/0016244 A1 * | 1/2009 | Sharma et al. | 370/307 |

OTHER PUBLICATIONS

Branden et al., "Resource ReSerVation Protocol (RSVP)—Version 1 Functional Specification," Sep. 1997, RFC 2205, http://datatracker.ietf.org/doc/rfc2205, The Internet Society, Reston, VA, USA (112 pages).

Awduche et al., "RSVP-TE: Extensions to RSVP for LSP Tunnels," Dec. 2001, RFC 3209, http://datatracker.ietf.org/doc/rfc3209, The Internet Society, Reston, VA, USA (sixty-one pages).

Pan et al., "Fast Reroute Extensions to RSVP-TE for LSP Tunnels," May 2005, RFC 4090, http://datatracker.ietf.org/doc/rfc4090, The Internet Society, Reston, VA, USA (thirty-eight pages).

\* cited by examiner

*Primary Examiner* — Willie J Daniel, Jr.
(74) *Attorney, Agent, or Firm* — The Law Office of Kirk D. Williams

(57) ABSTRACT

In one embodiment, forwarding information bases (FIBs) are selectively populated in a packet switch. A packet switching device determines, based on one or more protocol signaling messages, a subset, which is less than all, on which FIBs a lookup operation may be performed for identifying forwarding information for a received particular packet. The packet switching device populates each of these FIBs, but not all of the FIBs of the packet switching device, with forwarding information corresponding to the particular forwarding value. Thus, FIB resources are consumed for only those FIBs which could actually be used, and not all of the FIBs, for forwarding packets in the data plane of the packet switching device, whether these packets are received on a primary or backup path.

16 Claims, 5 Drawing Sheets

SELECTIVELY POPULATING FORWARDING INFORMATION BASES IN A PACKET SWITCH

TECHNICAL FIELD

The present disclosure relates generally to communicating information in a remote device over a network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology, including switching packets on labels especially in the core network using Multiprotocol Label Switching (MPLS).

Tunnels, such as MPLS-TE (Traffic Engineering) and MPLS-TP (Transport Profile), are paths established through a network in order to transport packets efficiently through a label switched network. Fast Re-Route (FRR) is a technology that allows backup paths to be established in the network, which can be used in case of a problem with a primary path (original primary path or currently used backup path) of the tunnel. RFC 4090, entitled "Fast Reroute Extensions to RSVP-TE for LSP Tunnels," provides an extension of the protocol signaling to establish backup label switched path (LSP) tunnels for local repair of LSP tunnels.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Figure 1:
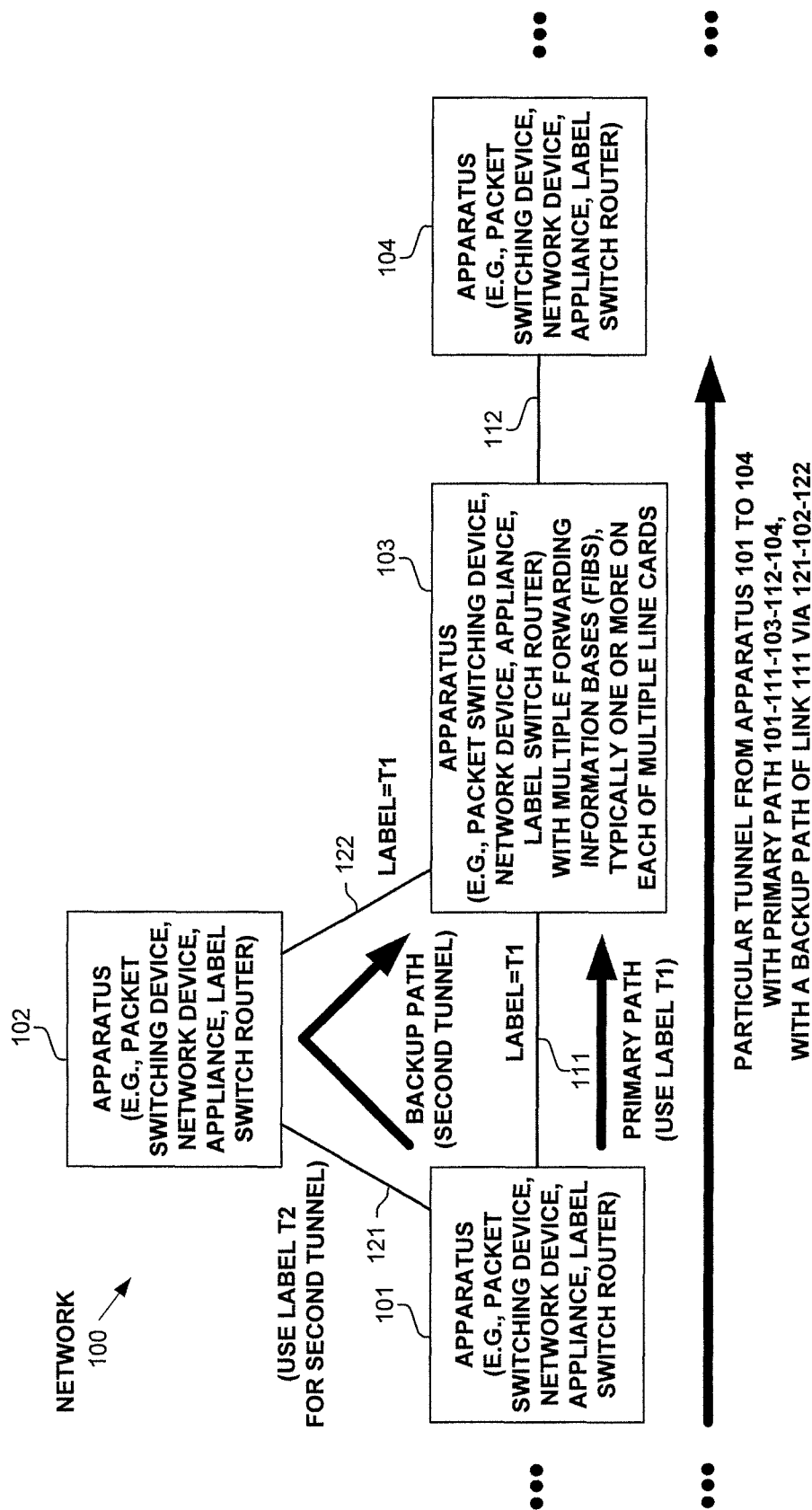
FIG. 1 illustrates a network operating according to one embodiment.

Disclosed are, inter alia, methods, apparatus, computer-storage media, mechanisms, and means associated with selectively populating forwarding information bases in a packet switch. In one embodiment, a packet switching device determines, based on one or more protocol signaling messages, a plurality of ingress forwarding information bases (FIBs) in a particular packet forwarding context on which a lookup operation may be performed for identifying forwarding information for a received particular packet. Note, the plurality of ingress forwarding information bases is less than all of the ingress forwarding information bases of the particular forwarding context in packet switching device. The packet switching device populates each of the plurality of ingress forwarding information bases, but not all of the ingress forwarding information bases of the packet switching device, with forwarding information corresponding to the particular forwarding value. Thus, FIB resources are consumed for only those FIBs which may be used for forwarding packets in the data plane of the packet switching device, whether these packets are received on a primary or backup path.

In one embodiment, the forwarding value is a label. In one embodiment, the label corresponds to a tunnel. In one embodiment, the packet switching device uses labels global to the packet switching device. In one embodiment, the packet switching device is a midpoint packet switching device of the tunnel, and not a packet switching device at one of the ends of the tunnel. In one embodiment, said one or more protocol signaling messages include information allowing correlation of primary and backup paths of the tunnel; and wherein said determining operation includes said correlation of said primary and said backup paths of the tunnel in determining the plurality of ingress forwarding information bases. In one embodiment, the label is the same for said primary and said backup paths of the tunnel. In one embodiment, the packet switching device consists of a single forwarding context.

2. Description

Disclosed are, inter alia, methods, apparatus, computer-storage media, mechanisms, and means associated with selectively populating forwarding information bases in a packet switch. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, or other implementation for performing the corresponding processing. The embodiments described hereinafter embody various aspects and configurations, with the figures illustrating exemplary and non-limiting configurations.

Note, computer-readable media and means for performing methods and processing block operations (e.g., a processor and memory or other apparatus configured to perform such operations) are disclosed and are in keeping with the extensible scope and spirit of the embodiments. Note, the term "apparatus" is used consistently herein with its common definition of an appliance or device.

Note, the steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

Disclosed are, inter alia, methods, apparatus, computer-storage media, mechanisms, and means associated with selectively populating forwarding information bases in a packet switch. One embodiment includes a method, comprising: determining, by a packet switching device based on one or more protocol signaling messages, a plurality of ingress forwarding information bases (FIBs) in a particular packet forwarding context on which a lookup operation may be performed, based on a particular forwarding value in the header of a received particular packet, to identify forwarding information for the received particular packet; wherein the plurality of ingress forwarding information bases is less than all ingress forwarding information bases used for forwarding packets in the data plane of the particular forwarding context in the packet switching device; and populating, by the packet switching device, each of the plurality of ingress forwarding information bases, but not all said ingress forwarding information bases used for forwarding packets in the data plane of the particular forwarding context in the packet switching device, with forwarding information corresponding to the particular forwarding value.

Note, as used herein, a forwarding context refers to a context in which a label is being interpreted. Thus, in a same forwarding context, a label is interpreted as being the same label for each packet. For example, if a packet switching device supports multiple virtual and/or logical packet switching devices, each of the virtual and/or logical packet switching devices is considered a different forwarding context. Further, if a packet switching device supports multiple VLANs with each having separate forwarding domains (e.g., populated in FIBs), then each of the multiple VLANs would be in a different forwarding context. For example, if a particular label used in switching packets for a first VLAN is interpreted differently when switching packets for a second VLAN, then the forwarding information for the first and second VLANs are in different forwarding contexts.

In one embodiment, the forwarding value is a label. In one embodiment, the label corresponds to a tunnel. In one embodiment, the packet switching device uses labels global to the packet switching device. In one embodiment, the packet switching device is an intermediate packet switching device of the tunnel, and not a packet switching device at an end of the tunnel. In one embodiment, said one or more protocol signaling messages includes information allowing correlation of primary and backup paths of the tunnel; and wherein said determining operation includes said correlation of said primary and said backup paths of the tunnel in determining the plurality of ingress forwarding information bases. In one embodiment, the label is the same for said primary and said backup paths of the tunnel. In one embodiment, the packet switching device consists of a single forwarding context.

One embodiment performs a method, comprising: receiving, by a packet switching device, one or more tunnel signaling messages providing the packet switching device information for a particular tunnel, with said information including primary path information for a particular primary path and backup path information for one or more particular backup paths; determining, by the packet switching device based on a correlation of said primary path information and said backup path information, a plurality of forwarding information bases (FIBs) which could be used in determining forwarding information for packets of the particular tunnel; and populating, by the packet switching device, each of the plurality of forwarding information bases, but not all forwarding information bases of the packet switching device, with forwarding information corresponding to the particular tunnel for use in forwarding packets over the particular tunnel.

In one embodiment, said one or more tunnel signaling messages includes a first tunnel signaling message received over a backup path of said one or more particular backup paths, with the first tunnel signaling message includes information for use in identifying said primary path. In one embodiment, said information for use in identifying said primary path includes an identification of a particular link that is being protected, with at least one of the particular primary path or said one or more particular backup paths traversing the particular link. In one embodiment, said information for use in identifying said primary path includes an identification of a label associated with the particular primary path. In one embodiment, the packet switching device uses labels global to the packet switching device. In one embodiment, the packet switching device is an intermediate packet switching device of the particular tunnel, and not a packet switching device at an end of the particular tunnel. In one embodiment, the packet switching device is a label switch router. In one embodiment, the packet switching device consists of a single forwarding context; and wherein the single forwarding context includes the plurality of forwarding information bases and at least one additional forwarding information base in a data plane of the packet switching device.

One embodiment includes an apparatus (e.g., packet switching device and/or appliance), comprising: a plurality of line cards configured for sending and receiving packets, including receiving one or more tunnel signaling messages providing information for a particular tunnel to be switched through the apparatus, with said information including primary path information for a particular primary path and backup path information for one or more particular backup tunnels; wherein each of the plurality of line cards includes one or more forwarding information bases (FIBs) in a data plane of the apparatus for determining forwarding information for received packets; and one or more route processors configured to determine, based on a correlation of said primary path information and said backup path information, the identification of a plurality of forwarding information bases (FIBs) that could be used in determining forwarding information for packets of the particular tunnel; wherein said one or more route processors are configured to cause each of the plurality of forwarding information bases, but not all of the forwarding information bases in the data plane of the apparatus to be populated with forwarding information corresponding to the particular tunnel.

In one embodiment, said one or more tunnel signaling messages includes a particular tunnel signaling message received over a backup tunnel of said one or more backup tunnels, wherein the particular tunnel signaling message includes an identification of a particular link that is being protected, with at least one of the particular primary path or said one or more particular backup tunnels traversing the particular link. In one embodiment, said one or more tunnel signaling messages includes a particular tunnel signaling message received over a backup tunnel of said one or more backup tunnels, wherein the particular tunnel signaling message includes an identification of a label associated with the particular primary path. In one embodiment, the apparatus is a label switch router. In one embodiment, the apparatus uses labels global to the packet switching device. In one embodiment, the apparatus is an intermediate packet switching device of the particular tunnel, and not a packet switching device at an end of the particular tunnel. In one embodiment, the intermediate packet switching device includes a single forwarding context. In one embodiment, each of the plurality of line cards includes a single one of said one or more forwarding information bases. In one embodiment, the apparatus is configured to packet switch based on labels received in a label stack of received packets, including based on a particular label corresponding to the particular tunnel, with the particular label being the same for the particular primary path and said one or more particular backup paths.

Expressly turning to the figures, FIG. 1 illustrates a network 100 operating according to one embodiment. Shown are four apparatus 101-104 (e.g., packet switching devices such as a label switch router, network device, and/or appliance). For explanation purposes, each of apparatus 101-104 will be referenced as a label switch router (LSR).

As shown, a particular tunnel is established, using a signaling protocol and exchanging of protocol signaling messages. Note, LSR 101 may, or may not, be an endpoint of the particular tunnel (e.g., LSR 101 may be an intermediate LSR on the path of the particular tunnel). The primary path of the particular tunnel includes spans from LSR 101 via link 111 to LSR 103 and via link 112 to LSR 104. Note, LSR 104 may be an intermediate LSR on the path of the particular tunnel, or an endpoint of the particular tunnel. Further, for this example embodiment, LSR 103 signals LSR 101 to use label T1 at the top of the label stack in the header of a packet sent to it on the particular tunnel.

A second tunnel from LSR 101 via link 121 to LSR 102 and via link 122 to LSR 103 is similarly configured using a signaling protocol and exchanging of protocol signaling messages. For example purposes, LSR 102 signals LSR 101 to use label (T2) at the top of the label stack in the header of a packet sent to it on the second tunnel. In one embodiment, LSR 101 creates the second tunnel in response to determining, or being instructed to, create a backup path to protect link 111 and/or protect all or certain tunnels traversing link 111.

In one embodiment, LSR 103 uses labels global to LSR 103. Thus, if a packet is received on any of its interfaces with a label (e.g., value T1 depicted) corresponding to the particular tunnel, then LSR 103 should forward the packet over the particular tunnel (e.g., via link 112 to LSR 104).

As shown in FIG. 1, link 111 (primary path of the particular tunnel and/or all or certain tunnels traversing link 111) is protected by LSR 101 using the second tunnel (backup path). When sending packets over the particular tunnel over link 111, LSR 101 includes label T1 at the top of the label stack of these packets. If link 111 cannot be used for communicating packets of the particular tunnel, LSR 101 sends packets over the backup path for the particular tunnel by sending packets to LSR 102, with these packets having a label stack including: label T2 followed by label T1. Thus, LSR 102 will receive these packets, pop the top label (T2) from the label stack of each of these packets, identify based on label T2 to send these packets to LSR 103. After popping the top label, the label at the top of the label stack of these packets is T1, which is the same label LSR 103 expects to receive for the particular tunnel. Therefore, these packets received with label T1 at the top of their label stack, are forwarded (after popping label T1 from their label stack) by LSR 103 over the particular tunnel to LSR 104.

It is often the case and typically desirable for reliability purposes, that the particular tunnel and the second tunnel are received on different line cards with different forwarding information bases (FIBs) used to perform lookup operations thereon. However, populating all FIBs with forwarding information for all labels consumes resources that may never be used to forward packets in the data plane of a packet switching device. These resources include, but are not limited to, memory locations, and/or ternary and/or binary content-addressable memory locations, etc. Additionally, processing cycles are consumed to update all of the FIBs in a packet switching device.

One embodiment, however, determines which of the FIBs (typically less than all) in a packet switching device possibly may receive a packet with a particular label based on which it needs to forward the packet. The packet switching device (e.g., LSR) selectively, and typically only, populates forwarding information corresponding to a particular label in the minimum set of FIBs that could possibly be used in forwarding a packet based on the particular label. The determination of this minimum best of FIBs is typically based on which interfaces (each having a correspondence to a FIB) such a packet could be received on primary and backup paths for a tunnel. In order to perform such automated determination, additional information to what is provided in prior protocol signaling messages is required.

One embodiment acquires such additional information by extending Resource Reservation Protocol (RSVP) to provide information which allows a packet switch to correlate primary and backup paths. Thus, a packet switch can use this additional information in determining which of its forwarding information bases (FIBs) could possibly be used in forwarding packets (e.g., in the data plane of the packet switch).

One embodiment determines this set of FIBs further based on backup paths of backup paths (e.g., which may be a recursive process). Further, in determining this minimal set of FIBS, one embodiment takes into consideration the effect of bundled links and bundled interfaces, which would allow a primary path or backup path to be one of multiple links possibly terminating on multiple line cards and/or possibly resulting in additional FIBs which could be used in forwarding a packet with a particular label. Note, bundled links and/or bundled interfaces provide for groupings of multiple links, so a packet may traverse any one of these multiple links (possibly based on numerous factors which select a particular link of these multiple links over which to send a particular packet). Thus, when bundled links and/or interfaces are use, the space or set of FIBs possibly used to determine forwarding information for a packet based on a particular label may be larger than the space or set of FIBs if bundled links and/or interfaces where not used.

Thus, from one or more received signaling protocol messages (e.g., communicated in establishing the particular tunnel or tunnel backing up a portion of the particular tunnel) or from an additional one or more signaling messages, LSR 103 knows that the second tunnel is protecting the particular tunnel, or that second tunnel is protecting the link carrying the particular tunnel. Therefore, LSR 103 populates the FIBs which could be used in forwarding packets of the particular tunnel and of the second tunnel with forwarding information for the label T1.

In providing this additional information to LSR 103, one embodiment communicates an extended RSVP message (including a new or modified RSVP object) or other message to LSR 103 on the second tunnel. This messages designates one or more primary tunnels (e.g., label T1 in our example) and/or a link (e.g., link 111). As LSR 103 knows what interface that it received this message, LSR 103 knows that it must populate forwarding information for these primary tunnels, either specified (e.g., by a label such as T1), or all labels corresponding to tunnels which could be received over link 111. In one embodiment, the extended RSVP or other message communicated to LSR 103 also includes an identification of the backup tunnel (e.g., T2) over which the RSVP or other message is being received, as the identification the tunnel over which a packet is received is often not communicated in a packet (e.g., in the case of Penultimate Hop Popping).

Again, bundled links and/or bundled interfaces and/or backup tunnels of backup tunnels might expand, possibly recursively, the space or set of FIBs that need to be populated for labels.

Thus, forwarding information for certain labels does not need to be populated in every FIB in a packet switching device (e.g., LSR 103), but only the minimal set of FIBs that could possibly be used in forwarding packets for these certain labels. The gain in reduced FIB resources by only populating the FIBs that could be used for the particular tunnel can be significant. For example, a customer that has 100,000 backup paths in an LSR uniformly distributed among the LSR's thirty-two line cards may require as few as approximately only 6,250 FIB entries instead of 100,000 FIB entries.

As shown in FIG. 1, one embodiment includes apparatus 103, which populates less than all of its FIBs with forwarding information for a tunnel (although all FIBs may be populated for certain tunnels). One embodiment includes apparatus 101 and/or 102 which communicates, via a signaling protocol (e.g., an extension of RSVP, or using another protocol), information which allows apparatus 103 to determine the relationship between primary and backup paths, such that apparatus 104 can correlate this primary and backup path information (possibly also correlating backup path of backup path information, and/or bundled interfaces and/or bundled links) to identify a minimum subset of the FIBs that could possibly be used in forwarding packets of particular primary paths (e.g., tunnels).

Figure 2:
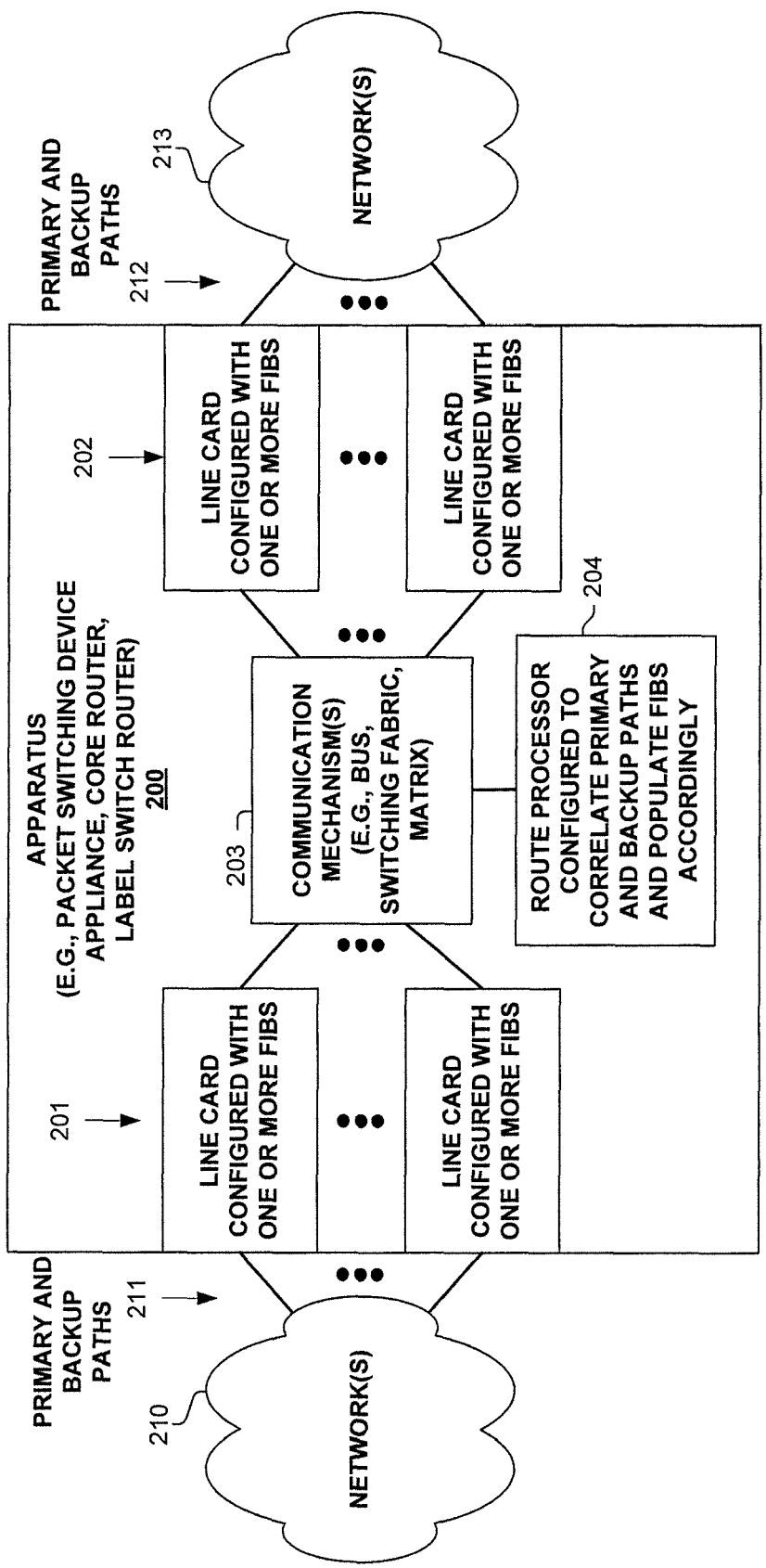
FIG. 2 illustrates an apparatus operating according to one embodiment.

Turning to FIG. 2, illustrates an apparatus 200 (e.g., packet switching devices such as a label switch router, network device, and/or appliance) operating in one embodiment. As shown, apparatus 200 includes line cards 201, 202 communicatively coupled via communication mechanism(s) 203 (e.g., bus, switching fabric, and/or matrix). Additionally, route processor 204 is configured to correlate primary and backup paths of tunnels, and to populate minimum subsets of FIBs with forwarding information for labels. Again, a minimum subset of FIBs for a particular path or label of the particular path is the set of FIBs that are determined to possibly be used in forwarding packets of a primary path, whether the label is received in a packet over the primary path or over a backup path, and possibly considering backup paths of a backup path and/or the possibly effect of bundled interfaces and/or bundled links.

As shown in FIG. 2, apparatus 200 is communicatively coupled via primary and backup paths 211, 212 to networks 210 and 213 (which could be the same network). As illustrated, each of line cards 201, 202 includes one or more FIBs. By correlating on which line card(s) 201, 202 and even within line cards 201, 202 that have multiple FIBs, primary and backup path(s) of tunnels, the number of FIB entries populated in apparatus 200 can typically be reduced, possibly significantly saving memory/storage resources and resources used to populate the FIBs.

Figure 3:
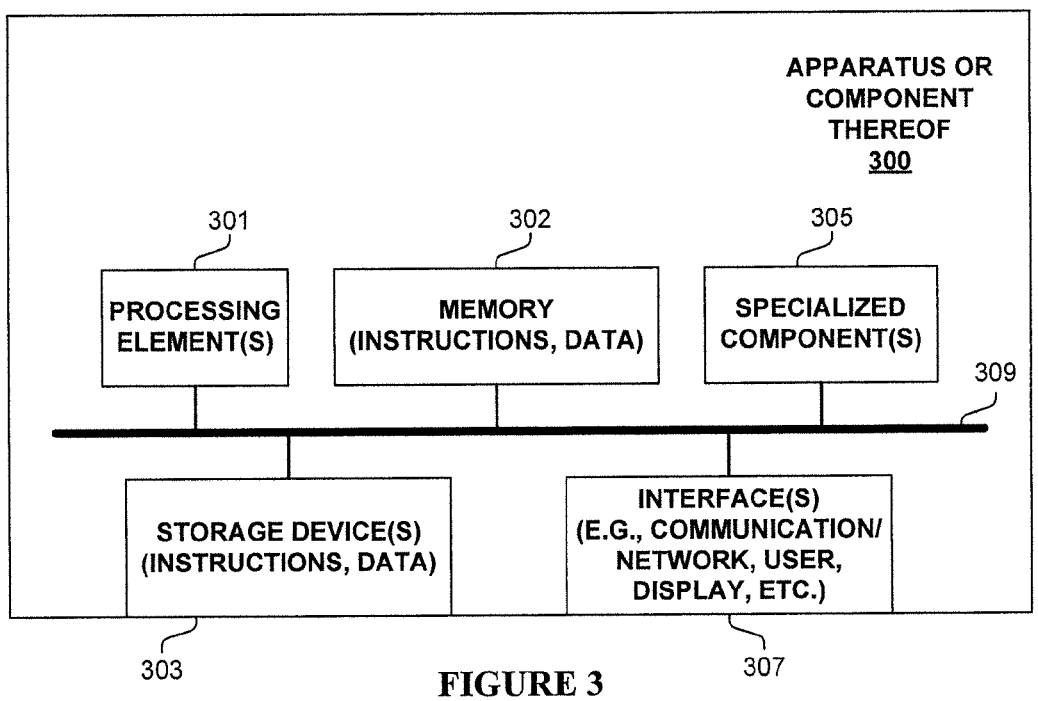
FIG. 3 illustrates an apparatus or component used in one embodiment.

FIG. 3 is a block diagram of an apparatus or component 300 used in one embodiment associated with selectively populating forwarding information bases in a packet switch. In one embodiment, apparatus or component 300 performs one or more processes corresponding to one of the flow diagrams illustrated or otherwise described herein.

In one embodiment, apparatus or component 300 includes one or more processing element(s) 301, memory 302, storage device(s) 303, specialized component(s) 305 (e.g. optimized hardware such as for performing operations, etc.), and interface(s) 307 for communicating information (e.g., sending and receiving packets, user-interfaces, displaying information, etc.), which are typically communicatively coupled via one or more communications mechanisms 309, with the communications paths typically tailored to meet the needs of a particular application. In one embodiment apparatus or component 300 corresponds to, or is part of, apparatus 101, 102, 103 and/or 104 of FIG. 1, and/or apparatus 200 of FIG. 2.

Various embodiments of apparatus or component 300 may include more or fewer elements. The operation of apparatus or component 300 is typically controlled by processing element(s) 301 using memory 302 and storage device(s) 303 to perform one or more tasks or processes. Memory 302 is one type of computer-readable/computer-storage medium, and typically comprises random access memory (RAM), read only memory (ROM), flash memory, integrated circuits, and/or other memory components. Memory 302 typically stores computer-executable instructions to be executed by processing element(s) 301 and/or data which is manipulated by processing element(s) 301 for implementing functionality in accordance with an embodiment. Storage device(s) 303 are another type of computer-readable medium, and typically comprise solid state storage media, disk drives, diskettes, networked services, tape drives, and other storage devices. Storage device(s) 303 typically store computer-executable instructions to be executed by processing element(s) 301 and/or data which is manipulated by processing element(s) 301 for implementing functionality in accordance with an embodiment.

Figure 4:
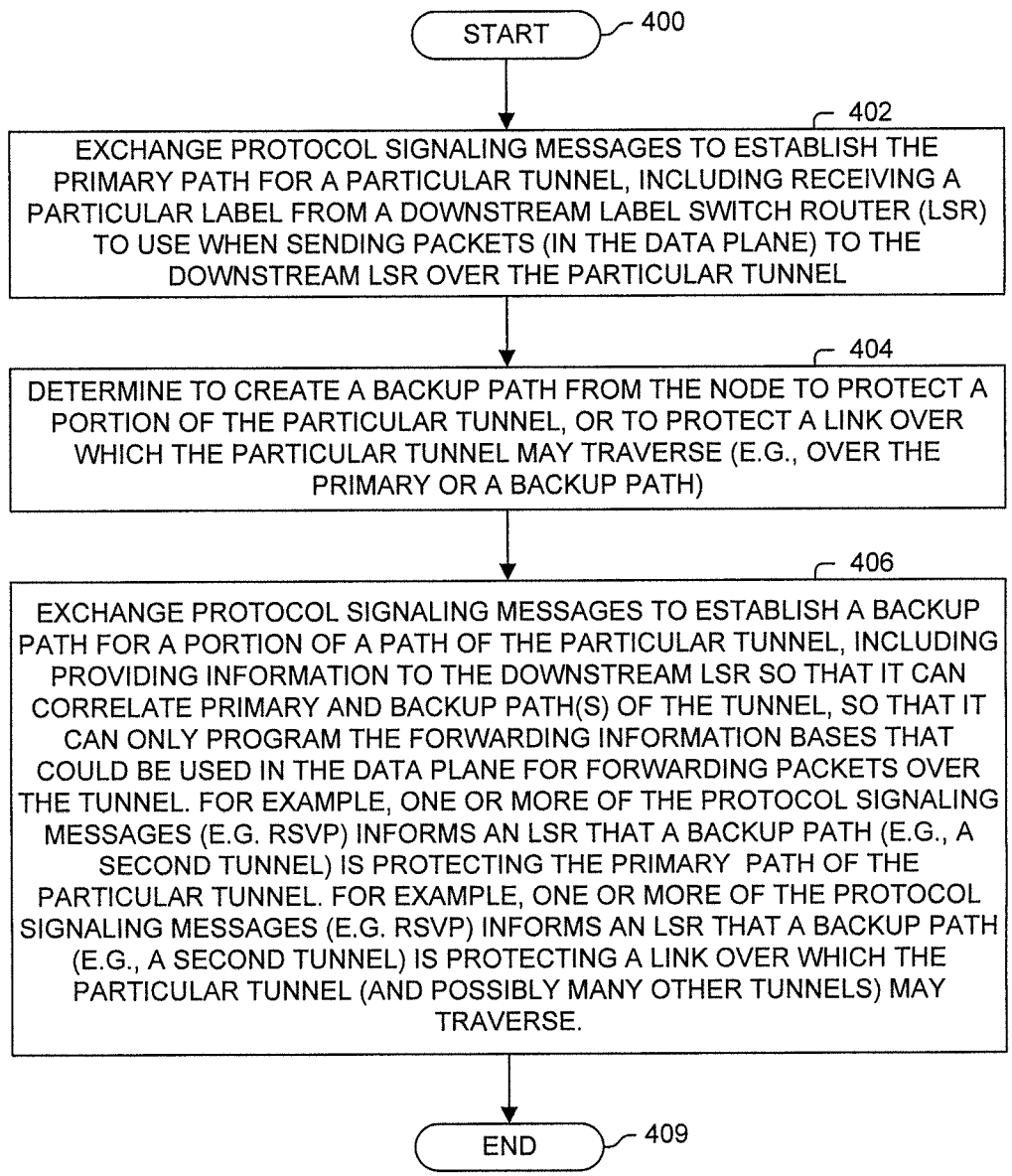
FIG. 4 illustrates a process performed in one embodiment.

FIG. 4 illustrates a process performed in one embodiment. Processing begins with process block 400. In process block 402, protocol signaling messages are exchanged to establish the primary path for a particular tunnel, which typically includes receiving a particular label for a downstream LSR to use when sending packets to the downstream LSR over the particular tunnel.

In process block 404, a determination is made to create a backup path from the node (e.g. the node performing these operations). This backup path may be used to protect one or more particular tunnels, and/or may be used to protect a link which is used to carry packet traffic of one or more tunnels.

In process block 406, protocol signaling messages are exchanged to establish a backup path for a portion of the particular tunnel, including providing information to the downstream LSR so that the downstream LSR can correlate primary and backup path(s) of the particular tunnel and substantially only program the FIBs that could potentially be used in the data plane for forwarding packets over the particular tunnel. For example, one or more of the protocol signaling messages (e.g. RSVP) informs an LSR that a backup path (e.g., a second tunnel) is protecting the primary path of the particular tunnel (and the LSR knows on which interface and/or link this protocol signaling message was received) For example, one or more of the protocol signaling messages (e.g. RSVP) informs an LSR that a backup path (e.g., a second tunnel) is protecting a link over which the particular tunnel (and possibly many other tunnels) may traverse (and the LSR knows on which interface and/or link this protocol signaling message was received).

Processing of the flow diagram of FIG. 4 is complete as indicated by process block 409.

Figure 5:
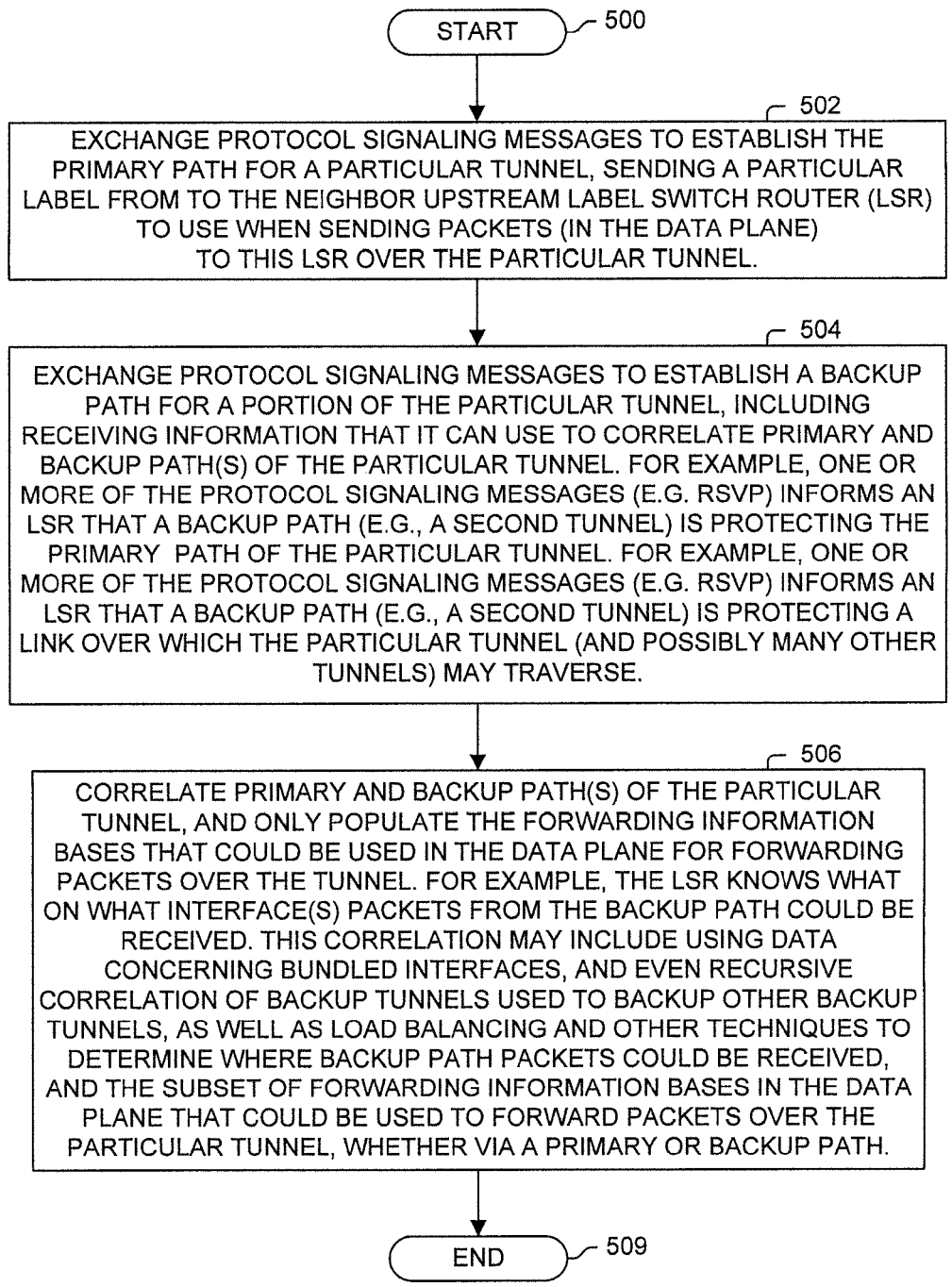
FIG. 5 illustrates a process performed in one embodiment.

FIG. 5 illustrates a process performed in one embodiment. Processing begins with process block 500. In process block 502, protocol signaling messages are exchanged to establish the primary path for a particular tunnel, which typically includes sending a particular label for an upstream LSR to use when sending packets over the particular tunnel to this apparatus (e.g., an LSR performing these operations).

In process block 504, protocol signaling messages are exchanged to establish a backup path for a portion of the particular tunnel, including receiving information that the LSR can use to correlate primary and backup path(s) of the particular tunnel. For example, one or more of the protocol signaling messages (e.g. RSVP) informs the LSR that a backup path (e.g., a second tunnel) is protecting the primary path of the particular tunnel (and the LSR knows on which interface and/or link this protocol signaling message was received) For example, one or more of the protocol signaling messages (e.g. RSVP) informs the LSR that a backup path (e.g., a second tunnel) is protecting a link over which the particular tunnel (and possibly many other tunnels) may traverse (and the LSR knows on which interface and/or link this protocol signaling message was received).

In process block 506, the primary and backup path(s) of the particular tunnel are correlated to identify the set of FIBs that could possibly be used in forwarding packets of the particular tunnel. Substantially only those FIBs that could potentially be used in the data plane for forwarding packets over the particular tunnel (either through a primary or backup path) are populated with the forwarding information (e.g., an entry corresponding to the label it advertised to use for the particular tunnel) for the particular tunnel. For example, the LSR knows what on what interface(s) packets from the backup path could be received. This correlation may include using data concerning bundled interfaces, and even recursive correlation of backup tunnels used to backup other backup tunnels, as well as load balancing and other techniques to determine where backup path packets could be received, and the subset of forwarding information bases in the data plane that could be used to forward packets over the tunnel, whether via a primary or backup path.

Processing of the flow diagram of FIG. 5 is complete as indicated by process block 509.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method, comprising:
    determining which plurality of ingress forwarding information bases (FIBs) in a particular packet forwarding context in which a lookup operation may be performed based on a particular forwarding value in the header of a received particular packet to identify forwarding information for the received particular packet, with said determining operation being performed by a packet switching device, with said determining operation including identifying said plurality of ingress FIBs based on which particular plurality of ingress interfaces a packet with the particular forwarding value could be received based on one or more received protocol signaling messages as said plurality of ingress FIBs are used to determine forwarding infoiuiation for packets received on said particular plurality of ingress interfaces; wherein said plurality of ingress FIBs are less than all ingress forwarding information bases actively used for forwarding packets in the data plane of the particular forwarding context in the packet switching device; and
    populating, by the packet switching device, each of the plurality of ingress FIBs with forwarding information corresponding to the particular forwarding value, but not all said ingress forwarding information bases actively used for forwarding packets in the data plane of the particular forwarding context in the packet switching device to exclude populating one or more non-relevant FIBs with forwarding information corresponding to the particular forwarding value that would be used for forwarding packets in the particular forwarding context if corresponding packets were received for processing by said non-relevant FIBs but said determining operation determined that said corresponding packets will not be received for processing by said non-relevant FIBs.

2. The method of claim 1, wherein the forwarding value is a label.

3. The method of claim 2, wherein the label corresponds to a tunnel.

4. The method of claim 3, wherein the packet switching device uses labels global to the packet switching device.

5. The method of claim 3, wherein the packet switching device is an intermediate packet switching device of the tunnel, and not a packet switching device at an end of the tunnel.

6. The method of claim 3, wherein said one or more protocol signaling messages includes information allowing correlation of primary and backup paths of the tunnel; and wherein said determining operation includes said correlation of said primary and said backup paths of the tunnel in determining the plurality of ingress forwarding information bases.

7. The method of claim 6, wherein the label is the same for said primary and said backup paths of the tunnel.

8. The method of claim 6, wherein the packet switching device consists of a single forwarding context.

9. A packet switching device, comprising:
one or more processing elements;
memory;
a plurality of interfaces configured for sending and receiving packets; and
one or more packet switching mechanisms configured to packet switch packets among said interfaces;
wherein the packet switching device is configured to perform operations, including:
determining which plurality of ingress forwarding information bases (FIBs) in a particular packet forwarding context in which a lookup operation may be performed based on a particular forwarding value in the header of a received particular packet to identify forwarding information for the received particular packet, with said determining operation including identifying said plurality of ingress FIBs based on which particular plurality of ingress interfaces of the plurality of interfaces a packet with the particular forwarding value could be received based on one or more received protocol signaling messages as said plurality of ingress FIBs are used to determine forwarding infoimation for packets received on said particular plurality of ingress interfaces; wherein said plurality of ingress FIBs are less than all ingress forwarding information bases actively used for forwarding packets in the data plane of the particular forwarding context in the packet switching device; and populating each of the plurality of ingress FIBs with forwarding information corresponding to the particular forwarding value, but not all said ingress forwarding information bases actively used for forwarding packets in the data plane of the particular forwarding context in the packet switching device to exclude populating one or more non-relevant FIBs with forwarding information corresponding to the particular forwarding value that would be used for forwarding packets in the particular forwarding context if corresponding packets were received for processing by said non-relevant FIBs but said determining operation determined that said corresponding packets will not be received for processing by said non-relevant FIBs.

10. The packet switching device of claim 9, wherein the forwarding value is a label.

11. The packet switching device of claim 10, wherein the label corresponds to a tunnel.

12. The packet switching device of claim 11, wherein the packet switching device uses labels global to the packet switching device.

13. The packet switching device of claim 11, wherein the packet switching device is an intermediate packet switching device of the tunnel, and not a packet switching device at an end of the tunnel.

14. The packet switching device of claim 11, wherein said one or more protocol signaling messages includes information allowing correlation of primary and backup paths of the tunnel; and wherein said determining operation includes said correlation of said primary and said backup paths of the tunnel in determining the plurality of ingress forwarding information bases.

15. The packet switching device of claim 14, wherein the label is the same for said primary and said backup paths of the tunnel.

16. The packet switching device of claim 14, wherein the packet switching device consists of a single forwarding context.

* * * * *